April 19, 1966  C. H. BRUNEEL  3,247,407
METHOD AND MACHINE FOR GENERATING ELECTRICITY
Filed April 3, 1963
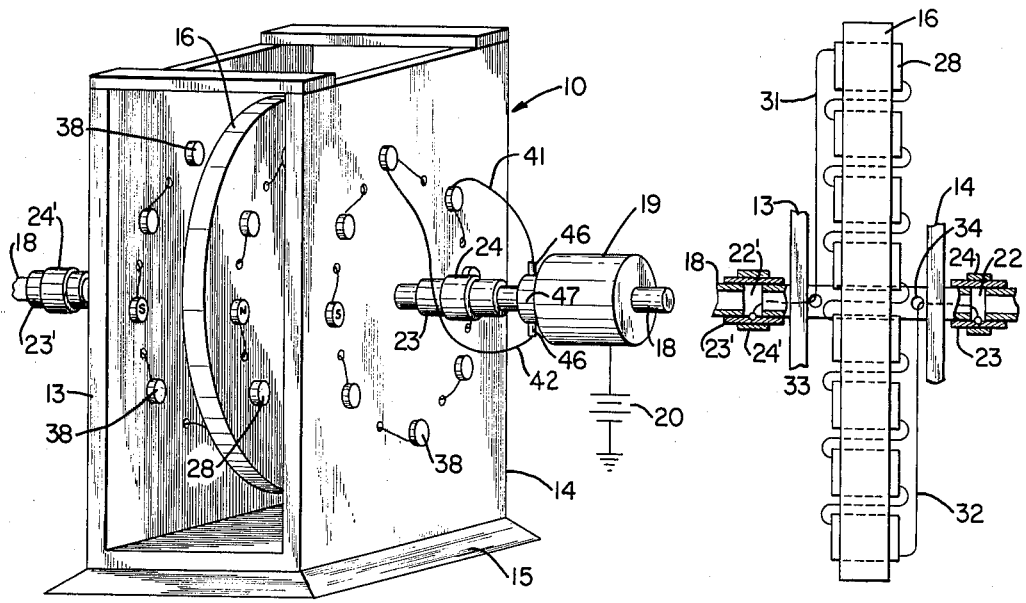
Fig. 1
Fig. 2
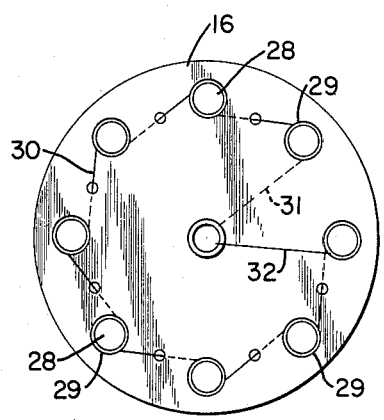
Fig. 3
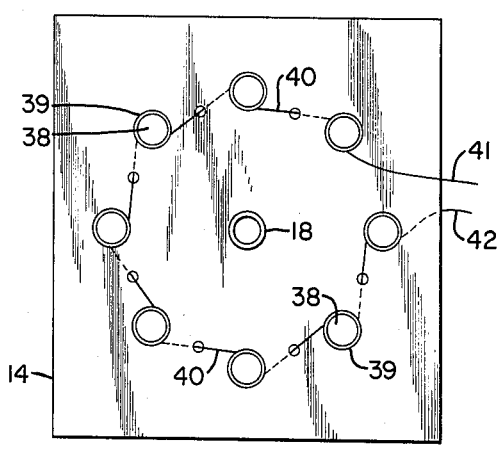
Fig. 4
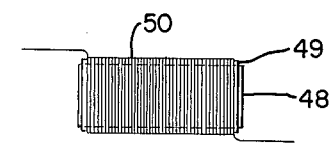
Fig. 5
INVENTOR.
CAMILLE H. BRUNEEL
BY
John E. Reilly
ATTORNEY United States Patent Office 3,247,407
Patented Apr. 19, 1966

3,247,407
METHOD AND MACHINE FOR GENERATING ELECTRICITY
Camille Henri Bruneel, P.O. Box 295, Derby, Colo.
Filed Apr. 3, 1963, Ser. No. 270,411
4 Claims. (Cl. 310—155)

This invention relates to a new and useful method and means for generating electricity, and more particularly relates to an alternator which utilizes the force of magnetic attraction or repulsion between permanent magnets to generate extremely high induced electrical output values.

It is customary practice to utilize a moving magnetic field for the purpose of generating an electric field and therefore an electromotive force, by electromagnetic induction. In essence, the electromotive force or voltage is induced by the action of magnetic lines of force cutting an electrical conductor due to the movement of the magnetic field relative to the conductor. In the same way, a growing or decaying magnetic field may, by mutual induction, induce an E.M.F. in a conductor, the direction of current flow depending upon the direction of motion of the magnetic field in relation to the conductor. Various electric machines in use are premised on the above general relationships and for example a generator customarily utilizes one member to provide a magnetic field and another member, the armature, to form a conductor which can carry a current under the influence of the field.

In accordance with the present invention, it is a principal object thereof to provide for a new and improved method and means for generating electricity from a moving magnetic field and in such a way as to realize maximum efficiency with relatively high electrical output values in relation to the motive power or input required; moreover, to provide a machine which is relatively simple and easy to install, and which requires a minimum number of moving parts.

It is another object of the present invention to provide in a generator for a unique magnetic field structure for generating electricity; furthermore, to provide for a way of producing extremely high induced voltages from the ineraction between relatively moving permanent magnetic fields employed in the field structure.

A further object of the present invention is to provide for an alternator in which the voltage induced in the conductor results from the mutual opposition or attraction between the magnetic fields of permanent magnets, while at the same time reducing magnetic opposition to rotation and substantially increasing the electrical output of the individual magnetic field producing elements.

The above and other objects, advantages, and features of the present invention will become more readily appreciated and understood from a consideration of the following detailed description of a preferred form of the present invention, taken together with the accompanying drawings, in which:

FIGURE 1 is a diagrammatic view in perspective of a preferred form of machine embodying the present invention.

FIGURE 2 is a side view of the rotor employed in the preferred form and schematically illustrating the electrical interconnection between windings in the field structure.

FIGURE 3 is a front view of the rotor structure again illustrating schematically the electrical interconnection between windings on the rotor member.

FIGURE 4 is a front view of one of the stator members; and

FIGURE 5 is an enlarged view of one of the field elements or pole pieces including the field winding and core utilized in accordance with the present invention.

Referring in more detail to the drawings, there is shown by way of illustrative example an alternator 10 which is broadly comprised of generally rectangular frame having opposite sides in the form of solid panels defining spaced stator members 13 and 14 mounted on a common base 15. A rotor drum 16 is mounted for rotation on a hollow drive shaft 18 in closely spaced, parallel relation between the stator members 13 and 14; and to drive the shaft and rotor a drive motor 19 having a battery source 20 is drivingly connected to one end of the drive shaft 18. In a conventional manner, not shown, the rotor drum is fixed for rotation on the drive shaft, and the drive shaft is journaled for rotation in suitable bearings, not shown, in the stationary panels 13 and 14. For a purpose to be described, opposite ends of the drive shaft 18 are split, as at 22 and 22' with sleeve type couplings 23 and 23' interconnecting the split portions, and the couplings having outer contact rings 24 and 24'.

The present invention is characterized in that both the stationary and moving elements, in the preferred form being the rotor and stator members, have permanent magnetic field structures which, by mutual interference with or interaction between the magnetic fields under relative motion, are capable of inducing extremely high voltages. Essentially, by overcoming the residual forces of the magnetic fields tending to resist relative motion between the stationary and moving magnetic field structures, the magnetic lines of force will undergo substantial compression or lengthening as a result of mutual repulsion or attraction, respectively, between the field structures thereby inducing unexpectedly high voltages. In the preferred form, the magnetic field structure for the rotor drum is defined by a series of field elements or pole pieces in the form of permanent magnets 28 positioned in openings at equally spaced circumferential intervals on a common circle about the rotor axis of rotation. Field windings 29 are coiled about the permanent magnets, the windings being connected in series by conductors 30. The conductors 30 include output leads 31 and 32 extending from adjacent field elements on the rotor structure through openings 33 and 34 in the shaft on opposite sides of the rotor; and the output leads pass in opposite directions through the shaft for connection with the contact rings 24 and 24' at opposite ends of the shaft.

Each of the stator members 13 and 14 has magnetic field elements defined by a series of magnets 38 with field windings 39 and conductor lines 40, the magnets and windings being arranged in a circle about the drive shaft at equally spaced intervals and on a radius equal to that of the circle of magnets 28 on the rotor. In addition, the magnets 38 on the stator 13 are coaxially aligned with the magnets on the stator 14 on axes parallel to the rotor axis. In this relation, the magnets 28 on the rotor correspond in number and spacing with the stator magnets 38 so as to be movable simultaneously into aligned confronting relation with the opposing pairs of magnets 38 on the stators. The field windings 39 and the conducting lines 40 for the stator members 13 have output leads, not shown, extending from adjacent magnets for connection into a suitable load to be driven off of the generator. In turn, the output leads 41 and 42 of the stator member 14 may be connected to brushes 46 on a collector ring 47 mounted on the drive shaft 18; or alternatively may be connected through a rectifier circuit not shown to the battery source 20 so that a portion of the generated electricity can be utilized to drive the motor.

Now considering in more detail the construction and relative disposition of the magnetic field structure, each of the magnets 28, 38 is formed of a core 48 of elongated cylindrical configuration, the core being composed of a material, such as Alnico, having a high permeability and retentivity and well suited for use as a permanent magnet. Wrapped around each magnet is a layer of insulation 49 to separate the magnet core from the field winding, and each field winding is preferably formed of layers of coils 50 composed of copper wire and wound in series to one another; however, it it to be understood that the coil construction and manner of winding may be varied according to the particular application for the alternator and output levels required. In this relation, the magnetic field elements for the rotor and stator members are identically formed as described but are so positioned in relation to one another as to establish either mutual attraction or mutual repulsion between the ends of the magnets in a manner now to be described.

In the preferred form, the magnets on the rotor are arranged on axes parallel to the rotor axis of rotation and with the north and south poles aligned in the same direction, as illustrated in FIGURE 1. To establish mutual repulsion between the magnets on the rotor and the stator members, the magnets 38 on the stator panel 13 are axially aligned with the magnets on the rotor, but with the south poles of the magnets disposed in facing relation to the south poles of the magnets on the rotor, and are arranged with the pole ends of facing magnets in close proximity to one another as the magnets move into aligned relation. Similarly, the magnets on the stator member 14 are aligned in the same direction as the magnets 28 and with the north pole ends of the magnets 38 in facing relation to the north pole ends of the magnets 28. Accordingly, movement of the circle of magnets on the rotor in a direction causing them to approach the magnets on the outer stator members will be strongly resisted due to the mutual repulsion between adjacent pole ends. Assuming that such resistance can be overcome, however, the mutual repulsion which opposes rotation as the magnets approach one another correspondingly aids or encourages rotation going away from the stationary magnets by the same force; and under rotation, will effectively counterbalance the mutual repulsion between the magnets and afford relatively low opposition to rotation, except for inertia of the rotating drum, friction and enegy losses in the bearings. For the reason that magnetic lines of force will repel each other but cannot cross or intersect, as each rotor magnet moves into close proximity between a pair of stator magnets, the magnetic lines of force therebetween are highly disturbed and placed under a high degree of compression; and when moving away from each other will decompress or lengthen so as to create electrical impulses in opposite directions. Induction in the coil surrounding the magnets will vary in direct proportion to the compression and decompression of the lines of force of opposing magnets; and since the magnets of the coils on the rotor are compressed from both ends by those of the stator, they will have approximately double the output of the stator coils. In accordance with well-known principles in the art, a current of electricity will be induced in the coil in a direction according to the direction of relative movement between the magnetic fields so that as the rotor magnets approach the stator magnets, a current is induced in one direction then in a return or reverse direction as the magnets move away from each other. Furthermore, the intensity of current induced in each of the coils will vary directly as the speed of approach and withdrawal within limits and inversely to the distance between the magnets. In light of this, it is most desirable to position the magnets with the least spacing possible between the pole ends.

It will be apparent from the foregoing that high torque is required to initiate rotation of the rotor drum so as to overcome the initial resistance of the stator magnets; however, as this initial resistance is overcome, the magnets reinforce this initial movement by effectively forcing the rotor magnets toward the next pair of magnets, and the rotor will rapidly increase to high speeds of rotation where effectively the resistance to rotation will be at a minimum.

If desired, a high torque motor may be utilized to start the rotor and to overcome the initial magnetic opposition to rotation, then switched to a very low torque motor for running since from then on the power needed will be only to maintain momentum, and the magnetic opposition to rotation will have become negligible for the reasons explained.

The machine will generate three separate currents, one from the rotor magnets and one each from the panels which may be independently utilized or combined in one circuit to provide extremely high electrical output values. As described, the electrical output from the stator 14 may be connected through a rectifier circuit either into the battery or directly to the drive motor to furnish more than the required motive power for driving the rotor once the drive rotor has overcome the initial resistance to rotation.

It is to be understood that the magnets on the rotor and stator may be aligned in mutually attracting relation to accomplish the same results as are derived from mutual repulsion. Furthermore, one or a plurality of generators of the character described may be mounted on a common shaft where for example all are in mutually repelling or mutually attracting relation; or alternatively, where one generator is in mutually repelling relation as described in the preferred form and a second generator is in mutually attracting relation so as to effectively counterbalance one another. Various different forms and configurations of permanent magnetic core structures may be utilized to form the field in each of the rotor and stator members, it being understood that the particular form described is given more for the purpose of illustration than limitation. Moreover, various different forms of coil windings or equivalent current-carrying conductor elements may be employed as a means of conducting electricity generated by the magnets when under relative motion. Accordingly, it is to be understood that the above and other modifications and changes may be made in the construction and relationship of parts comprising the present invention without departing from the spirit and scope thereof as defined by the appended claims.

What is claimed is:

1. A machine for generating electricity comprising a stator, a rotor mounted for rotation in spaced parallel relation to said stator, each of said stator and rotor members having a series of permanent magnets arranged in equally spaced, circumferential intervals to provide for simultaneous movement of the magnets on said rotor into and away from coaxial alignment with the magnets on said stator, each of the magnets on said stator having magnetic poles at opposite ends being aligned in the same direction whereby the pole ends of the magnets on said stator in facing relation to said rotor are of the same polarity, each of the magnets on said rotor having magnetic poles at opposite ends being aligned in the same direction so that the pole ends of the magnets on said rotor in facing relation to said stator are of the same polarity, windings for said magnets on each of said stator and rotor members, and drive means for rotating said rotor to repeatedly advance the magnets on said rotor toward and away from closely spaced confronting relation to the magnets on said stator whereby to induce a current in the windings for each of the magnets in a direction according to the direction of relative movement between the magnetic poles on said rotor and stator members.

2. An induction type alternator comprising a pair of spaced parallel stator members, a drive shaft extending in journaled relation transversely through said stators, a rotor keyed for rotation on said shaft in spaced parallel relation between said stators, a series of permanent magnets mounted on each of said stators at equally spaced circumferential intervals on common circles about the rotor axis of rotation, the magnets on said stators being aligned in coaxial relation on axes parallel to the rotor axis of rotation and having magnetic poles of fixed, opposite polarity in facing relation, a series of permanent magnets on said rotor corresponding in number and spacing with the magnets on each of said stators, the magnets on said rotor having magnetic fields at opposite ends movable through the magnetic fields of said magnets to the magnetic poles in facing relation on said stators, windings for the magnets on each of said stator and rotor members with the windings on each of said members being interconnected in series, and drive means at one end of said drive shaft for rotating said rotor between said stator members to provide for simultaneous movement of the magnets on said rotor simultaneously toward and away from confronting relation to the magnets on said stators against the resistance to relative movement between the magnetic fields of said magnets to induce a current in the windings for each of the magnets in a direction in accordance with the direction of relative movement and polarity of the magnetic poles on said rotor and stator members.

3. An induction type alternator according to claim 2, the magnets on said rotor having magnetic poles aligned in mutually repelling relation to the facing magnetic poles on said stator members.

4. An induction type alternator according to claim 2, the magnets on said rotor having magnetic poles aligned in mutually attracting relation to the facing magnetic poles on said stator members.

References Cited by the Examiner
UNITED STATES PATENTS

| | | | |
|---|---|---|---|
| 175,361 | 3/1876 | Livingston | 310—168 |
| 243,747 | 7/1881 | Wood | 310—268 |
| 697,963 | 4/1902 | Apple | 310—152 |
| 1,863,294 | 6/1932 | Bogia | 310—46 |

ORIS L. RADER, *Primary Examiner.*

MILTON O. HIRSHFIELD, *Examiner.*